United States Patent [19]
Harris et al.

[11] 4,422,726
[45] Dec. 27, 1983

[54] METHOD OF MAKING AN ELECTRO-OPTICAL DISPLAY

[75] Inventors: Steven D. Harris, Uniontown; Joseph I. Wolfe, Stow, both of Ohio

[73] Assignee: Eaton Corporation, Cleveland, Ohio

[21] Appl. No.: 311,692

[22] Filed: Oct. 14, 1981

[51] Int. Cl.³ ............................................ G02F 1/133
[52] U.S. Cl. ................................. 350/331 R; 350/343
[58] Field of Search .................... 350/331 R, 343, 344, 350/334

[56] References Cited

U.S. PATENT DOCUMENTS

| | | | |
|---|---|---|---|
| 3,912,366 | 10/1975 | Sprokel | 350/339 R |
| 3,990,781 | 11/1976 | Gum | 350/343 |
| 3,994,568 | 11/1976 | King et al. | 350/343 |
| 4,150,878 | 4/1979 | Barzilai et al. | 350/344 |
| 4,231,034 | 10/1980 | Bechteler | 350/341 X |

*Primary Examiner*—John K. Corbin
*Assistant Examiner*—David Lewis
*Attorney, Agent, or Firm*—C. H. Grace; A. R. Chrow

[57] ABSTRACT

Disclosed is a method of making an electro-optical display and the display made by such method having improved optical uniformity provided by the use of one or two pressure plates having raised portions that are dimensionally adapted to press uniformly on the seal enclosing the electro-optical material in a cavity between two plates of the display or uniformly upon the seal and at least one support member disposed in the cavity as a means of providing support and improving parallelism between the plates. The method also includes embodiments of electro-optical displays in which the support members, if used in the display, comprise a plurality of graphically shaped support members that not only provide support and improve parallelism between the plates but which are also able to convey information to a viewer of the display regardless of whether the electro-optical material is in an electrically energized or an electrically unenergized state.

9 Claims, 1 Drawing Figure

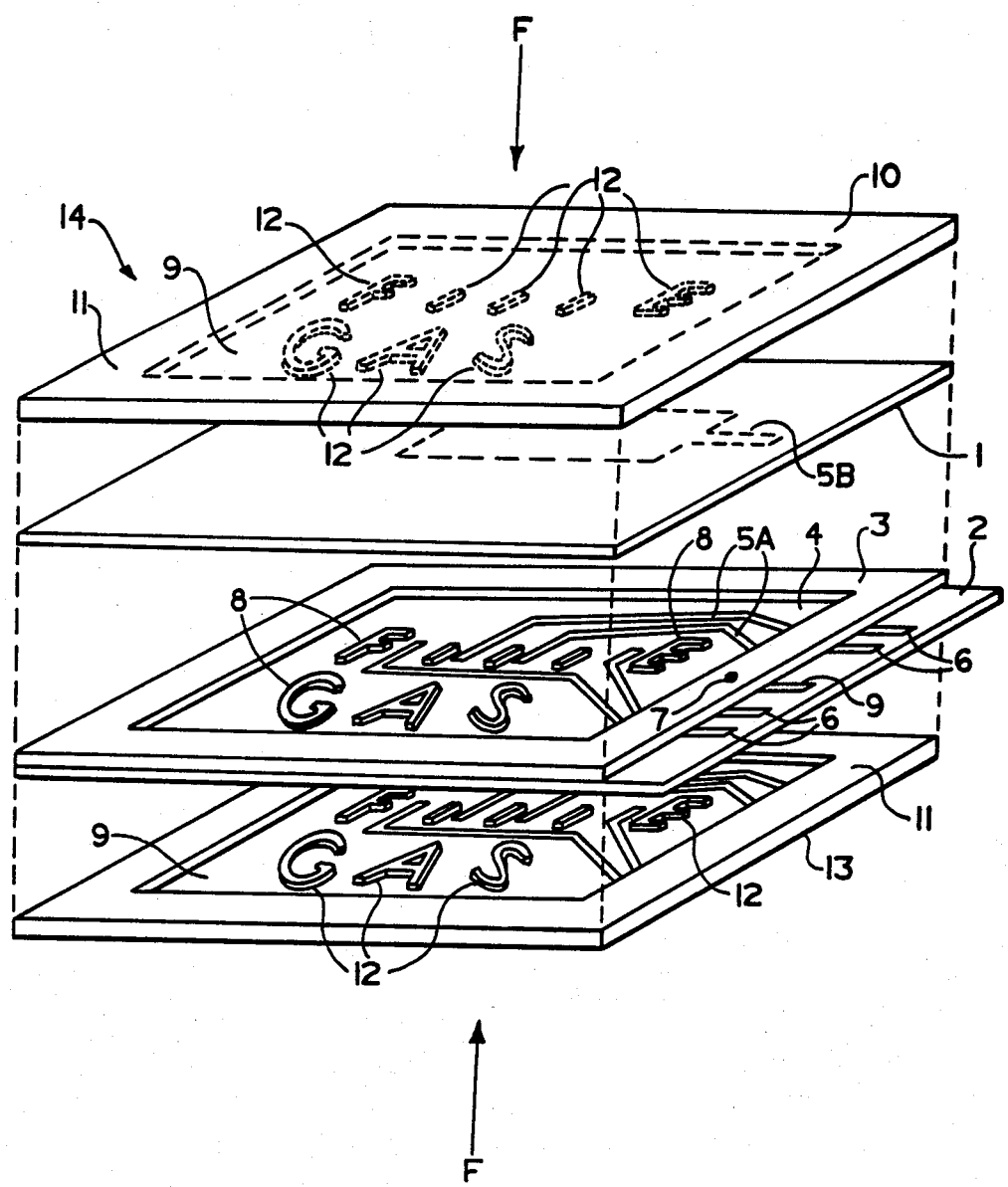

METHOD OF MAKING AN ELECTRO-OPTICAL DISPLAY

INTRODUCTION

This invention relates generally to a method of making electro-optical displays of the type which contain an electro-optical material hermetically sealed within a cavity between two plates of the display and more particularly to a method of making such displays having only the hermetic seal or having the hermetic seal in combination with a plurality of support members disposed within the cavity as a means of providing support and maintaining parallelism between the plates across the cavity where the support members are preferably graphically shaped such that in combination they convey information to a viewer of the display regardless of whether the electro-optical material is in an electrically energized or an electrically unenergized state.

BACKGROUND OF THE INVENTION

Electro-optical displays utilizing an electro-optical material whose ability to block or transmit light is dependent on its ability to re-orient the direction of its molecular structure with respect to the direction of incident light as a result of its being converted from electrically energized state to an electrically un-energized state or vice versa is well known in the art.

Such displays typically feature the electro-optical material hermetically sealed within a cavity between two plates of which at least one of the plates is made from a transparent material such as glass or quartz or other suitable material. In instances where both of the plates are transparent, the display is termed a "transmissive type" display. In transmissive type displays, light is able to enter into the cavity through one of the plates and exit from the cavity through the other plate. A "reflective type" display on the other hand is provided where either both of the plates are transparent and a reflector is disposed on the side of one of the plates facing away from the cavity such that the reflector is able to reflect light back into the cavity that has entered into the cavity through the other transparent plate or alternatively where one of the plates is itself a non-transparent reflector able to reflect light back into the cavity that has entered into the cavity through the other transparent plate.

Electro-optical materials suitable for use in transmissive and reflective type displays are well known in the art and generally feature an organic crystalline structure alone or in combination with an organic amorphous medium with the crystalline structure having the ability to block or transmit light dependent upon the direction that incident light impinges upon the structure in combination with having the ability to re-orient the direction of its crystalline structure in response to an electrical field imposed thereacross and thus changing the direction of its crystalline structure with respect to the direction of the incident light. Electro-optical materials generally include materials such as liquid crystalline nematic materials, smectic materials and cholesteric materials in which in the absence of an electrical field, nematic materials feature the crystalline structure randomly dispersed throughout the amorphous medium, smectic materials feature the crystalline structure tending to lay in planes within the amorphous medium and cholesteric materials feature the crystalline structure in the form of coils within the amorphous medium. Most commonly in use are nematic liquid crystalline materials which preferably have sufficient positive dielectric anistrophy such that in the absence of an electrical field they tend to align substantially parallel to uni-directional rubbing lines provided by rubbing a suitable surfactant coating disposed on the surface of the plates in contact with the nematic liquid crystalline material and to align parallel to an electrical field imparted thereacross in the presence of an electrical field. Such displays become even more effective by rotating the direction of the rubbing lines on one of the plates from the direction of the rubbing lines on the other plate so as to impart a twist to the nematic liquid crystalline material and thereby increase the responsiveness of the nematic material to lower level electrical fields. Also in common use are cholesteric materials particularly when they are able to change to a nematic phase material in the presence of an electrical field. In addition, electro-optical materials commonly employ blends of two or more of liquid crystalline materials as well as blends of such materials with homologous nonliquid crystalline materials and other compatible materials such as dichroic dyes and the like to produce a particularly desired effect.

In addition to the previously described electro-optical materials, such displays may further include polarizing films disposed on one or both of the sides of the plates facing away from the cavity where desired which may be aligned or crossed to each other depending on the particular optical characteristics desired.

The electro-optical material contained within the previously described displays is commonly electrically energized by means of supplying electrical power to a transparent electrically conductive coating such as a coating of tin oxide or indium oxide disposed in the form of discrete images on the side of the plates facing toward the cavity and in contact with the electro-optical material such that, by selectively energizing the electro-optical material between a particular discrete image aligned between the plates, the electro-optical material contained in the cavity therebetween is caused to re-orient the direction of its molecular structure with respect to the direction of incident light so as to either block or transmit the image to a viewer of the display.

Although electro-optical displays have been used for many years, a problem has existed, particularly with respect to larger displays, in providing support and maintaining parallelism between the plates across the display cavity. It has been observed that undesirable refraction patterns tend to appear in the electro-optical material in regions of the cavity where the plates are closer together due to the difficulty in maintaining parallelism between the plates across the cavity and that such refraction patterns tend to become more of a problem as the size of the display cavity is increased due to the even greater difficultly in maintaining parallelism between the plates of larger displays.

Although the hermetic seal itself is generally able to provide support and maintain suitable parallelism for displays having smaller cavities, the ability of the seal to provide such support and parallelism between the plates is highly dependant upon the uniformity of pressure exerted on the seal when the plates are pressed together during the process of making the display.

As a means of aiding the seal in providing support and maintaining parallelism between the plates, it has been common practice in the past to mix solid materials such as glass beads or fibers to the electro-optical material provided that such materials are compatible with the electro-optical material and are able to be used without interfering with the electrical properties of the display and the optical properties desired of the electro-optical material. Although the addition of such materials as glass beads and fibers has been used to advantage, the practice has not been altogether satisfactory in that such materials may tend to migrate within the electro-optical material to the extent that higher concentrations occur in some regions of the cavity versus other regions and thereby diminish the ability of such materials to maintain parallelism between the plates.

More recently a support member made from glass or a flurocarbon based bead, such as disclosed in U.S. Pat. No. 3,990,781, has been disposed within the cavity such that it extends across the cavity from one plate to the other plate to provide support and maintain parallelism between the plates. Even more recently, a plurality of graphically shaped support members have been found to provide support and improve parallelism between the plates in addition to providing information to a viewer of the display regardless of whether the electro-optical material is in an electrically energized or electically un-energized state.

Although such support members within the cavity, either singularly or in conjunction with materials such as glass beads or fibers, are able to provide support and improved parallelism between the plates, a problem (as in the case with the seal above) has existed in being able to press the plates uniformly together while pressing with substantially equal force upon the hermetic sealant and upon the individual support members in order to insure that the plates are evenly spaced across the cavity so as to preclude the development of the previously described undesirable refraction patterns in the electro-optical material and thereby improve the optical uniformity of the display.

SUMMARY OF THE INVENTION

Accordingly, it is an object of this invention to provide an electro-optical display made by a method that provides the display with improved optical uniformity.

It is another object of this invention to provide a method of making an electro-optical display that reduces or eliminates undesirable refraction patterns arising in the electro-optical material enclosed by a hermetic seal within a cavity between two plates of the display as a result of unequal spacing between the plates due to non-uniform pressure being exerted upon the plates during the process of pressing the plates together.

It is yet another object of this invention to provide a method of making an electro-optical display having a plurality of support members disposed within a cavity of the display containing the electro-optical material enclosed by a seal by which refraction patterns are reduced or eliminated that might otherwise arise in the electro-optical material as a result of unequal pressure being exerted upon the seal and the support members during the process of pressing the plates together.

BRIEF DESCRIPTION OF THE DRAWINGS

The FIGURE shows an exploded perspective view of an embodiment of an electro-optical display in the process of being made by the method of the present invention.

DETAILED DESCRIPTION OF PREFERRED EMBODIMENTS

Shown in the FIGURE is electro-optical Display 14 in the process of being made by the method of the present invention. Display 14 has spaced apart plates 1 and 2 that for transmissive type displays are preferably made from transparent glass but may be made from transparent quartz or other transparent material that is suitable for use in such displays. In the event that a reflective type display is desired, display 14 may have a reflector (not shown) disposed adjacent the side of plate 2 facing away from plate 1 or, in the alternative, plate 2 may itself be a reflector rather than transparent provided it is not so electrically conductive as to electrically interfere with electrical conductive coatings 5B and 5A disposed respectively on the facing surfaces of plates 1 and 2. In the event that display 14 is a transmissive type display, coatings 5A and 5B are made from a transparent electrically conductive material such as tin oxide or indium oxide. In the event that plate 2 is itself a reflector and is not required to be transparent, then coating 5A is not required to be transparent.

Disposed between plates 1 and 2 is hermetic seal 3. Seal 3 encloses cavity 4 and is made from a sealant composition that is non-conductive and is able to bond plates 1 and 2 together so as to hermetically seal an electro-optical material within cavity 4 between plates 1 and 2 after they have been pressed together. Although the FIGURE shows the hereinafter described support members disposed in the cavity of the display in conjunction with seal 3, the method of the present invention also includes embodiments of optical displays that have no support members in the cavity containing the electro-optical material.

Coating 5A is in the form of a plurality of discrete segments having separate leads 6 extending past seal 3 for connection to a source of electrical power. Although other suitable means may be utilized to transfer electrical power to plate 1, for the embodiment shown in the FIGURE, electrical power is transferred from plate 1 to plate 2 by means of lead 9 of coating 5A that electrically contacts plug 7 through seal 3 which in turn electrically contacts coating 5B on plate 1. Plug 7 is made from any suitable electrically conductive material such as for example, silver and the like. Coating 5B is in the form of discrete patterns which, when aligned with coating 5A in the manner desired, is able to provide an electrical field therebetween and thereby electrically energize the electro-optical material contained within cavity 4 between the particular aligned portion of coating 5A and 5B and thereby impart an image of the particular electrically energized segment of coating 5A to a viewer of the display. Although coatings 5B and 5A may be respectivley disposed on plates 1 and 2 by any suitable manner, they are commonly disposed thereupon by silk-screening-etching techniques well known to those ordinarily skilled in the art such as where the undesired portions of coatings 5A and 5B are removed by a suitable etching material such as hydrofluoric acid.

Support members 8 in the form of graphically shaped letters "F" and "E", the word "GAS" and the referenced bars are disposed in cavity 4. For the purposes of this invention the term "support members 8" includes support members that are graphically shaped such as the letters "F" and "E" and the word "GAS" as well as the referenced bars or other shapes (not shown) which in combination are only intended to provide support and improved parallelism between the plates and are not intended to convey information to a viewer of the display. Support members 8 are of substantially the same thickness as seal 3 which typically is in the order of about 10 microns to about 100 microns. Although shown in the FIGURE as only being disposed on plate 2, seal 3 and support members 8 may also be disposed in a mirror image aligned relationship on the side of plate 1 facing plate 2 with their respective thicknesses on plates 1 and 2 adjusted such that the desired thickness of seal 3 and support members 8 is achieved when plates 1 and 2 are pressed together.

Support members 8 are made from a material that is non-conductive and non-contaminating to the electro-optical material contained within cavity 4 and possess the desired rigidity to provide support and maintain parallelism between plates 1 and 2 during and after the time they are pressed together in conjunction with preferably aiding seal 3 in bonding plate 1 to plate 2. Embodiments of optical displays made by the method of the present invention include those displays having at least one support member 8 disposed in cavity 4 that is not graphically shaped either alone or in conjunction with support members 8 that are graphically shaped or where all of the support members 8 are graphically shaped so that in combination they are able to convey information to a viewer of the display regardless of whether the electro-optical material contained in cavity 4 is in an electrically energized state or an electrically unenergized state as previously described. Although not required, Seal 3 and support members 8 are preferably made from the same material, such as for example, glass or where they are both made from a composition comprising a blend of a thermoplastic phenoxy and at least one epoxy resin that contains an amount of a cross-linking agent such as ethyl methyl imidizole sufficient to convert the composition to a thermoset by heating display 14 for sufficient time at a temperature high enough to convert the composition to a thermoset without damaging display 14. Although Seal 3 and support members 8 may be disposed on plate 2 or on both plates 1 and 2 by any suitable manner, they are preferably disposed thereupon by the previously described silk-screening-etching techniques well known to those ordinarily skilled in the art.

Although a particular type of display is shown in the FIGURE, it is to be understood that any type of electro-optical display that utilizes a hermetic seal to contain the electro-optical material within a cavity between two plates of the display or that in combination with such seal feature support members, such as support members 8, whether or not graphically shaped, is considered within the scope of the invention.

Pressure plates 10 and 13 are disposed respectively adjacent the side of plates 1 and 2 facing away from cavity 4. Although only one pressure plate may be used in practicing the method of the invention, two pressure plates such as plates 10 and 13 may also be used where desired. Plates 10 and 13 are made from a material having sufficient rigidity to press plates 1 and 2 uniformly together when an external force F is applied (such as by clamping or other suitable means) in such a manner as to uniformly press plates 10 and 13 respectively against plates 1 and 2 and urge plates 1 and 2 together. Whether or not the electro-optical material is present in cavity 4 when plates 10 and 13 are pressed against plates 1 and 2 generally depends on the type of sealant used and whether the electro-optical material is to be poured into cavity 4 or injected through seal 3 after plates 1 and 2 have been pressed together. Sufficient material has been removed from plates 10 and 13 in referenced areas 9 on the side of plates 10 and 13 facing towards plates 1 and 2 to respectively provide raised portions 11 and 12. There is an individual raised portion 12 to correspond with each support member 8 and raised portion 11 corresponds to seal 3. In cases where the display cavity does not utilize support members then plates 10 and 13 are only required to have raised portion 11. Raised portions 11 and 12 are of substantially the same height so that plates 10 and 13 are respectively able to press uniformly against plates 1 and 2. Raised portions 11 and 12 are respectively aligned with and dimensionally adapted to press uniformly against seal 3 and support members 8 when plates 1 and 2 are pressed together by plates 10 and 13 and thereby minimize or eliminate refraction patterns in the electro-optical material that might otherwise arise had plates 1 and 2 been pressed together in regions on plates 1 and 2 between support members 8.

Although not required, portions 11 and 12 are respectively preferably substantially dimensionally equivalent images of seal 3 and support members 8 such that the facing dimensions of portion 11 and seal 3 are substantially dimensionally equivalent and the facing dimension of each member 12 is substantially equivalent to the facing dimensions of the particular support member 8 to which it respectively corresponds.

Although plates 10 and 13 may be made from any suitable material such as metal from which material is removed by machining or other suitable techniques to provide raised portions 11 and 12, they are preferably made from a material such as glass, which is able to be etched by a suitable etching solution such as hydrofluoric acid to provide raised portions 11 and 12. The same silk-screen used in conjunction with etching to provide seal 3 and support members 8 on plate 2 can be conveniently used to provide raised portions 11 and 12 on plates 10 and 13. In cases where seal 3 and support members 8 are made from compositions that require curing under heat while plates 1 and 2 are being pressed together by plates 10 and 13, the materials from which plates 10 and 13 are made must necessarily be able to withstand such heat.

Thus the invention provides a method of making an electro-optical display having improved optical uniformity by providing one or two pressure plates having at least one raised portion that is respectively aligned with and are dimensionally adapted to press uniformly against seal 3 or a plurality of raised portions adapted to press uniformly against seal 3 and support members 8 where present to reduce undesirable refraction patterns that otherwise might arise in the electro-optical material had the raised portions not been present on the pressure plates and the display plates merely pressed together in the manner commonly practiced in the past.

What is claimed is:

1. A method of making an electro-optical display having improved optical uniformity, said display comprising a pair of plates of which at least one plate is transparent, said plates bonded together by means of a seal made from an hermetic sealant composition that encloses a cavity between the plates that contains an electro-optical material whose ability to convey information to a viewer of the display is dependent upon whether the electro-optical material is in an electrically energized or an electrically unenergized state imparted thereto by means of an electrically conductive coating in the form of at least one discrete image disposed on side of the plates facing towards the electro-optical material, said method including the steps of:

(a) providing at least one pressure plate in addition to said pair of plates having at least one raised portion on the surface thereof, said raised portion dimensionally adapted to align with and press uniformly substantially only upon the seal when the pressure plate is positioned and pressed against the side of the optical display plate facing away from the cavity so as to minimize or eliminate refraction patterns that might have otherwise arisen in the electro-optical material in the absence of the uniform pressure provided by the raised portion;

(b) positioning the pressure plate of step (a) on the side of the optical display plate facing away from the cavity; and (c) pressing the pressure plate of step (b) against the display plate so as to urge both of the display plates together.

2. The method of claim 1 wherein at least one support member is disposed in the display cavity as a means of providing support and maintaining parallelism between the display plates and the pressure plate has raised portions that are dimensionally adapted to align with and press uniformly substantially only upon the support members and the seal when the pressure plate is positioned and pressed against the display plate.

3. The method of claim 2 wherein a plurality of graphically shaped support members are disposed in the display cavity as a means of providing support and improving parallelism between the plates and which in combination are able to convey information to a viewer of the display regardless of whether the electro-optical material is in an electrically energized or an electrically unenergized state and the pressure plate has raised portions dimensionally adapted to align with and press uniformly upon the seal and respective support members when the pressure plate is positioned and pressed against the display plate.

4. The method of claim 1 wherein the pressure plate is made from metal and the raised portion is provided by machining the metal.

5. The method of claim 1 wherein the pressure plate is made from a material that is able to be etched and the raised portions are provided by etching said material.

6. The method of claim 5 wherein the pressure plate material is glass.

7. The method of claim 1 having two of said pressure plates and the pressure plates are pressed respectively against the side of each of the optical display plates facing away from the cavity.

8. The method of claim 1 wherein the support members aid in bonding the display plates together.

9. An electro-optical display made by the method of claim 1 or 2 or 3.

* * * * *